(12) United States Patent
Spreafico

(10) Patent No.: US 7,009,104 B2
(45) Date of Patent: Mar. 7, 2006

(54) SUPERCONDUCTING CABLE

(75) Inventor: Sergio Spreafico, Erba (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 115 days.

(21) Appl. No.: 10/026,761

(22) Filed: Dec. 27, 2001

(65) Prior Publication Data

US 2002/0153162 A1 Oct. 24, 2002

Related U.S. Application Data

(60) Provisional application No. 60/259,222, filed on Jan. 3, 2001.

(30) Foreign Application Priority Data

Dec. 27, 2000 (EP) .................................. 00128546

(51) Int. Cl.
*H01B 12/00* (2006.01)
(52) U.S. Cl. .................... 174/15.5; 174/125.1; 29/599; 505/230; 505/430
(58) Field of Classification Search ............... 174/15.4, 174/125.1, 15.5; 505/886, 230–232, 430–433; 29/599
See application file for complete search history.

(56) References Cited

U.S. PATENT DOCUMENTS

| 3,502,783 | A | * | 3/1970 | Aupoix et al. .............. 174/15.5 |
| 3,562,401 | A | * | 2/1971 | Long .......................... 174/15.5 |
| 3,631,519 | A | * | 12/1971 | Salahshourian ............. 174/73.1 |
| 3,643,002 | A | * | 2/1972 | Minnich ..................... 174/15.5 |
| 3,686,423 | A | * | 8/1972 | Doose et al. ............... 174/15.5 |
| 3,736,365 | A | * | 5/1973 | Bobo et al. ................. 174/15.5 |
| 3,781,455 | A | | 12/1973 | Hildebrandt |
| 4,394,534 | A | * | 7/1983 | Bahder et al. .............. 174/15.5 |
| 4,845,308 | A | * | 7/1989 | Womack et al. ........... 174/15.4 |
| 4,947,007 | A | * | 8/1990 | Dew et al. .................. 174/15.5 |
| 4,966,886 | A | * | 10/1990 | Hoshiko ..................... 505/230 |
| 5,741,377 | A | | 4/1998 | Goyal et al. |
| 6,255,595 | B1 | * | 7/2001 | Metra et al. .............. 174/125.1 |
| 6,262,375 | B1 | * | 7/2001 | Engelhardt et al. ...... 174/125.1 |
| 6,509,819 | B1 | * | 1/2003 | Snitchler et al. ............ 335/216 |
| 6,512,311 | B1 | * | 1/2003 | Metra et al. ................ 307/147 |

FOREIGN PATENT DOCUMENTS

| DE | 2 301 425 | 7/1974 |
| EP | 0 747 975 A1 | 12/1996 |

OTHER PUBLICATIONS

Hara, T. et al., "Feasibility Study of Compact High-TC Superconducting Cables", IEEE Transactions on Power Delivery, vol. 7, No. 4, pp. 1745-1753, Oct. 1992.
Engelhardt, John S. et al., "Application Considerations For HTSC Power Transmission Cables", Fifth Annual Conference on Superconductivity and Applications, NYSIS, Sep. 24-26, 1991.

* cited by examiner

*Primary Examiner*—Kamand Cuneo
*Assistant Examiner*—Jeremy Norris
(74) *Attorney, Agent, or Firm*—Finnegan, Henderson, Farabow, Garrett & Dunner, L.L.P.

(57) ABSTRACT

A superconducting cable comprising at least a superconducting conductor and a cryostat, including a thermal insulation and an inner tube, with a protecting element between the superconducting conductor and the inner tube, to prevent damages to the superconducting material by the inner tube of the cryostat.

20 Claims, 2 Drawing Sheets

SUPERCONDUCTING CABLE

CROSS REFERENCE TO RELATED APPLICATIONS

This application claims the benefit of U.S. Provisional Application No. 60/259,222, filed Jan. 3, 2001, the content of which is incorporated herein by reference, and claims the right to priority based on European Application No. 00128546.9, filed Dec. 27, 2000.

In a general aspect, the present invention relates to a superconducting cable comprising a superconducting conductor and a cryostat.

More particularly, the invention relates to a superconducting cable comprising a superconducting conductor and a cryostat wherein a protecting layer is provided between the superconducting conductor and the cryostat.

The term "superconducting cable" encompasses a cable to be used to transmit current in conditions of so-called superconductivity, i.e. in conditions of almost null electric resistance. See, for example, Engelhardt J. S. et al., Application Consideration for HTSC Power Transmission Cable, 5$^{th}$ Annual Conference on Superconductivity and Application, Buffalo, N.Y., Sep. 24–26, 1991.

The term "superconducting conductor" indicates in the following description and claims any element capable of transmitting electric current in superconductivity conditions, such as, for instance, a layer of superconducting material supported by a tubular core, or tapes of superconducting material partially or totally surrounded by noble metal, which are wound on a supporting core in one or more layers.

The term "superconducting material" indicates a material, for example special ceramics based on mixed oxides of copper, barium and yttrium (usually called YBCO), of bismuth, lead, strontium, calcium, copper (usually called BSCCO), or of thallium or mercury and barium, calcium copper, comprising a superconducting phase having a substantially null resistivity under a given temperature, defined as critical temperature or $T_c$. For example, for the above mentioned materials the $T_c$ ranges from about 60 K (−213° C.) and about 170 K (−103° C.).

Usually the superconducting material, particularly the BSCCO material, is produced and used in form of mono- or multi-superconductor element tapes wherein the material is surrounded by a metal, generally silver optionally added with aluminium or magnesium.

The operative temperature of a superconductive cable is lower the $T_c$ of the superconductive material present therein.

The term "operative temperature" indicates in the following the temperature at which the superconducting cable transmit electric current in superconductivity conditions. Specifically such temperature is lower than the $T_c$.

The superconducting cables are provided with at least one channel for the flow of the cryogen. The cryogen is typically liquid helium, liquid nitrogen, liquid hydrogen, liquid argon or mixture thereof, operating at temperature and pressure specific for the application.

For maintaining the superconducting material at the operative temperature a cryostat is provided externally to the superconducting conductor. Such cryostat generally comprises a thermal insulation enclosed in two tubes. The thermal insulation for superconducting cables consists of various materials such as, for example, polyester resin tapes, polytetrafluoro-ethylene fibres, metallizzed Mylar™. A general review about the cryostat used in the field is IEEE TRANSACTIONS ON POWER DELIVERY, vol. 7, No. 4, October 1992, pages 1745–1753.

The inner and outer tubes are coaxially positioned, respectively, on the inner and outer surface of the thermal insulation. They define the chamber where the thermal insulation is positioned under vacuum. These tubes are generally metal tubes made of fibreglass or stainless steel, the latter being preferably corrugated so as to confer flexibility to the cryostat structure.

The cryostat may be, by means of the inner tube, in direct contact to the superconducting conductor or loosely positioned around it.

The Applicant has found that when the superconducting conductor is or comes into contact—during cable construction, transportation or—installation—with the inner tube of the cryostat, the superconducting material of the external layer, and possibly also of the internal layer(s), may get damaged. The same problems may arise during the operation of the cable. In fact, during the operation of the cable a thermal shrinkage of the cooled elements occurs thus bringing them into mutual contact, especially in curvilinear tracts in the path of the cable. This phenomenon is particularly evident in case of clamped head configuration.

The clamped head configuration indicates a cable configuration wherein opposite ends of the cable are mechanically fixed to respective clamping terminals such that substantially no relative sliding between superconducting material, supports and the terminal themselves takes place in axial direction.

It has been found that providing a protecting element between the superconducting conductor and the inner tube of the cryostat, the damage to the first by the latter is prevented while maintaining the effectiveness of the thermal insulating system.

Therefore the present invention relates to a superconducting cable comprising at least a superconducting conductor and a cryostat positioned externally to the superconducting conductor, and said cryostat including a thermal insulation enclosed between an inner and an outer coaxial tubes, wherein a protecting element is provided between the superconducting conductor and the inner tube of the cryostat.

The protecting element provided between the superconducting conductor and the inner tube has a substantially constant thickness, such as to uniformly distribute the external pressure over its whole surface.

Preferably, the internal surface of the protecting element, i.e. the surface in contact with the superconducting material, is smooth.

Preferably, the external surface of the protecting element, i.e. the one in contact with the inner tube of the cryostat, is firm and flexible.

Preferably the protecting element is made of two layers, the inner being smooth and the outer being firm and flexible.

The thickness of said protecting element is, preferably, equal or greater than about 0.2 mm. More preferably, it is comprised between about 0.2 mm and about 3 mm, and even more preferably between 0.4 mm and 1 mm.

The protecting element may include one or more layers of at least one tape, wire, sheet or combination thereof. The at least one tape or wire is helically wound on the superconducting conductor, and the at least one sheet is wrapped up on the superconducting conductor.

In order to obtain a thickness as constant as possible, the at least one tape or sheet is preferably positioned with juxtaposed windings or rims on the superconducting conductor.

The protecting element comprises at least one material selected from polymeric materials, e.g. polytetrafluoroethylene (PTFE or Teflon®) or nylon; metals, e.g. copper or stainless steel; carbon paper and kraft paper, and combination thereof. Preferably the protecting element of the invention is made of polymeric material.

Preferably, the superconducting cable of the invention has a clamped head configuration.

The cryogenic fluid useful for the cable of the present invention may be any fluid having, at the operative condition, a transition temperature from liquid to gaseous state higher than the $T_c$ of the superconducting material, i.e. liquid helium, liquid nitrogen, liquid hydrogen and/or liquid argon. Preferably, the cable of the invention is cooled with liquid nitrogen at a temperature typically of from about 65 to about 90 K.

The superconducting material of the cable of the present invention may be, for example, an oxide of lanthanum and/or barium and/or strontium, copper (LaSCO) or of bismuth, lead, strontium, calcium, copper (BSCCO), or of yttrium (and/or other rare earth such as Nd, Sm, Eu, Gd), barium, copper (YBCO), or of thallium, barium (and/or strontium), calcium, copper, or of mercury, barium (and/or strontium), calcium, copper, or of lead, strontium, yttrium, copper.

The superconducting material of the invention may be produced by any of the methods known in the art, for example, by the oxide powder in tube (OPIT) method for the BSCCO, or by that described in U.S. Pat. No. 5,741,377 (in the name of Martin Marietta Corporation) for YBCO.

The tapes may also be mono- or multi-superconductor element, as described in the application EP 747 975 (in the Applicant's name).

In another aspect, the present invention relates to a method for protecting a superconducting cable comprising at least a superconducting conductor and a cryostat positioned externally to the to the superconducting conductor, said cryostat including a thermal insulation enclosed between an inner and an outer coaxial tubes, from the mechanical damages to the superconducting material of the superconducting conductor due to the contact with the inner tube of the cryostat, which comprises the phase of providing a protecting element between the superconducting conductor and the inner tube.

According to a further aspect, the invention relates to a current transmission/distribution network comprising at least one superconducting cable comprising at least a superconducting conductor and a cryostat positioned externally to the to the superconducting conductor, said cryostat including a thermal insulation enclosed between an inner and an outer coaxial tubes, wherein a protecting element provided between the superconducting conductor and the inner tube of the cryostat.

Further features and advantages of the present invention will become more apparent from the following drawings reporting some of the preferred embodiments, which are non-limitative illustrations of the invention.

Figure 1:
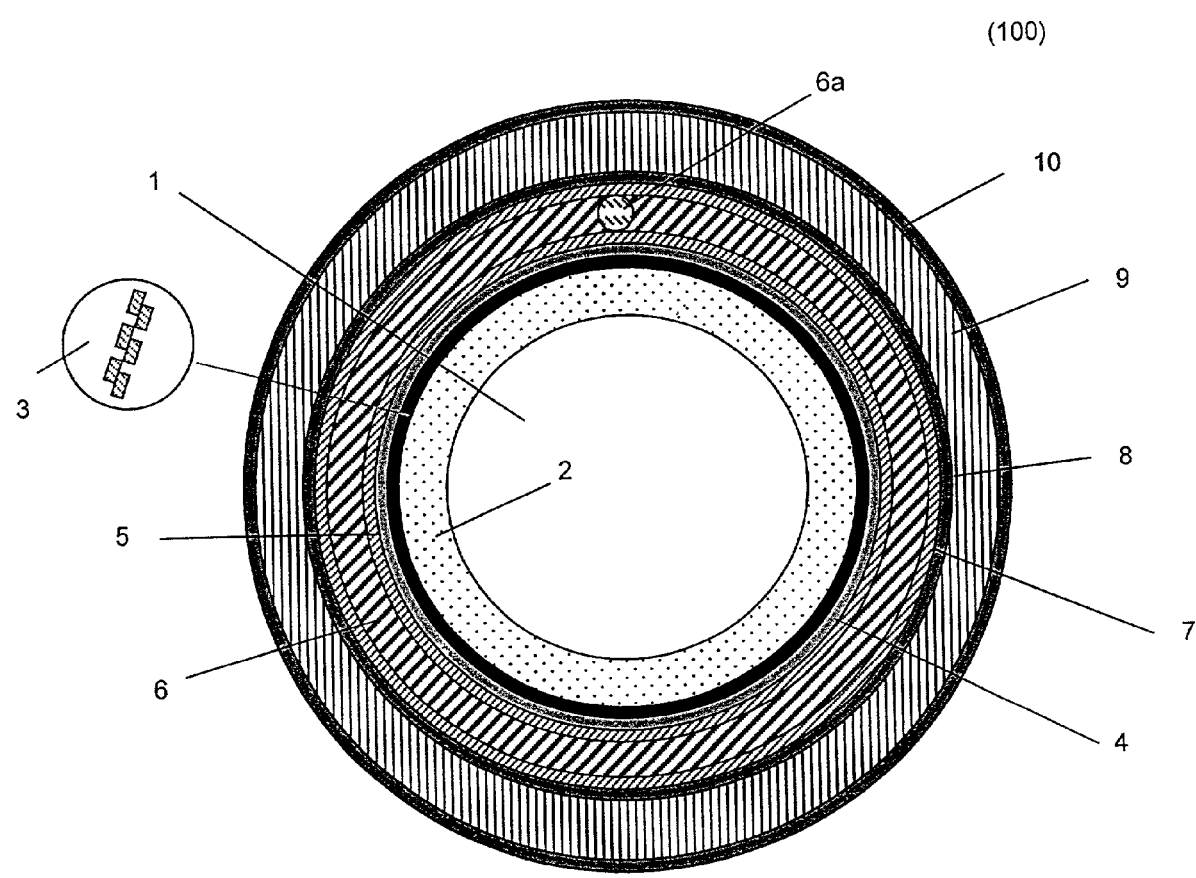
FIG. 1 shows a transversal section of a warm dielectric (hereinafter WD) superconducting cable according to the invention.

In detail, FIG. 1 shows a specific embodiment of a WD superconducting cable (100) according to the present invention. The superconducting conductor (3) comprises a plurality of superconducting tapes wound on a support (2). The inner surface of the support (2) defines the channel (1) wherein the cryogenic fluid flows.

For reducing as much as possible accidental mechanical internal damages, the superconducting tapes are preferably wound on the support (2) with winding angles comprised between 10° and 60°, such angles being constant or variable for each layer.

The superconducting conductor (3) may be in direct contact with the support (2), or layer(s) of carbon paper may be interposed between the superconducting conductor (3) and the support (2) for minimising mechanical stress among the tapes.

The superconducting conductor (3) is thermally insulated by means of a coaxial cryostat comprising an inner metal tube (5), an outer metal tube (7), and a thermal insulation (6) interposed between said inner and outer tubes.

The metal tubes (5) and (7) are preferably made of a 0.5-mm thick stainless steel tape, more preferably corrugated.

The thermal insulation (6) consists, for example, of surface-metallized polyester resin tapes, known as "thermal superinsulation", loosely wound, possibly interposing spacers (6a) for spacing the metal tubes (5) and (7).

Preferably, such spacers (6a) are placed at 120° each other with respect to the cable transversal section. Moreover they are preferably made of polytetrafluoroethylene.

At the moment of operating the cable, a vacuum of, typically, $10^{-6}$ bar is created in the thermal insulation by means of a vacuum apparatus.

The cryostat is separated from the superconducting conductor (3) by a protecting layer (4). In this embodiment, such layer (4) is made of 4 layers of carbon paper having a thickness of 0.1 mm each (0.4 mm of total thickness).

A first electrostatic shield (8), an electric insulation (9) and a second electrostatic shield (10) are set coaxially externally to the cryostat. Said shields (8) and (10) and the insulation (9) may be lapped or extruded.

In case of lapped electrostatic shields, they may consist of insulating oil-impregnated tapes of various materials such as, for example, smooth or crêpe carbon paper and metallized carbon.

In case of a lapped electric insulation, it may consist of a plurality of layers comprising, for example, paper tapes and/or laminates combining paper layers with plastic layers (e.g. polypropylene layers).

Alternatively, the electrostatic shields (8) and (10) and the electric insulation layer (9) may be obtained by extruding and optionally cross-linking ethylene-propylene rubber (EPR) or polyethylene (XLPE).

In addition, the superconducting cable (100) comprises an external metallic shield (not illustrated) made, for example, of copper tapes and in contact with the second electrostatic shield (10). This external metallic shield is earth connected so as its electric potential and that of the shield (10) are null.

Other protecting layer(s) (not illustrated) may be externally provided for minimising any kind of stress for the cable (100) at the moment of the installation.

Figure 2:
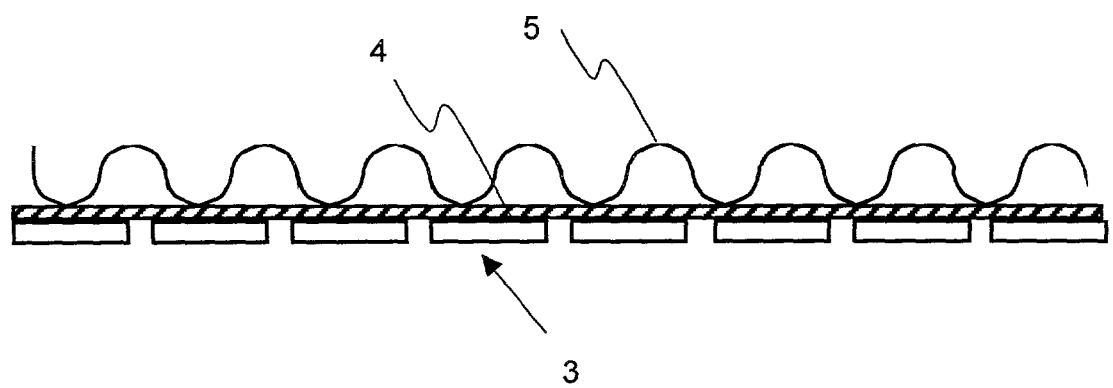
FIG. 2 is a sketched representation of a longitudinal section of the superconducting conductor, protecting element and inner tube of the cable according to the invention.

FIG. 2 shows a sketched longitudinal section of the superconducting conductor (3), protecting layer (4) and inner tube (5) of the cable according to the invention, such inner tube (5) being corrugated.

The invention shall be now illustrated by means of non-limitative examples.

EXAMPLE 1

A WD superconducting cable (100) was prepared having the following features:

| | | |
|---|---|---|
| Support | inner diameter | 22 mm |
| | outer diameter | 28.7 mm |
| Superconducting material | BSCCO-2223 tapes | 5 mm wide |
| | | 0.3 mm thick |
| Superconducting conductor | 2 oppositely helically wound layers outer diameter | 30 mm |

Coaxially to the superconducting conductor a cryostat including two corrugated tubes separated by a thermal super-insulation (surface-metallized polyester resin tapes) was positioned having the following characteristics:

| | |
|---|---|
| Inner diameter: | 32 mm (measured on the top of the crests) |
| Material: | 316 stainless steel |
| Thickness: | 0.5 mm |
| Corrugation pitch: | 10 mm |
| Corrugation depth: | 4 mm |

Multiple (10×) bending test, in dry conditions (i.e. without cryogenic fluid) at room temperature on a diameter of 1.8 m were performed on 5 samples of 10 m-long cables having respectively the following superconducting conductor/inner tube configuration:

a) superconducting conductor in direct contact to the inner tube;
b) superconducting conductor protected by 2 layers of 0.10 mm-thick carbon paper;
c) superconducting conductor protected, sequentially from inside to outside, by 1 layer of 0.10 mm-thick Teflone® (PTFE) and 1 layer of 0.20 mm-thick copper tape;
d) superconducting conductor protected, sequentially from inside to outside, by 1 layer of 0.10 mm-thick carbon paper and 48 wires of tefloned copper having a diameter of 0.5 mm each, and helically wound The bending test simulated the production and installation steps of the cable.

At the end of the test 3 meters were cut off from the edges of each sample, and the critical current measurement was effected in the central portion of each sample. The measurements of Ic and $Ic_0$ were carried out at the same point of the sample by the electrical transport 4 probe technique determining the voltage at 1 $\mu$V/cm $E_c$.

By measuring the critical current of a tape it is possible to assess a possible degradation of the current transport properties of the superconducting tape.

The results are set forth in the following Table 1, wherein $Ic_0$ is the value of critical current before effecting the test, Ic is the value of critical current measured following the test. The $Ic/Ic_0$ ratio is the retention of current after the test.

TABLE 1

| Superconducting conductor/cryostat protecting element | $Ic/Ic_0$ for the inner superconducting layer | $Ic/Ic_0$ for the outer superconducting layer |
|---|---|---|
| a) none | 100% | 80% |
| b) 2 layers of carbon paper | 100% | 100% |
| c) 1 layer of PTFE + 1 layer of copper tapes | 100% | 100% |
| d) 1 layer of carbon paper + 48 0.5 mm-thick wires of tefloned copper | 100% | 100% |

A degradation of the current transport capacity for the outer superconducting layer of the configuration a) was observed. This is attributable to the pressure exerted by the contact between the superconducting material and the crests of the corrugated inner tube of the cryostat.

The deposition of a protecting layer between the superconducting conductor and the corrugated inner tube avoids the irreversible damage of the superconducting material.

EXAMPLE 2

A WD superconducting cable (100) having the characteristics set forth in Example 1 was tested as follows.

Figure 3:
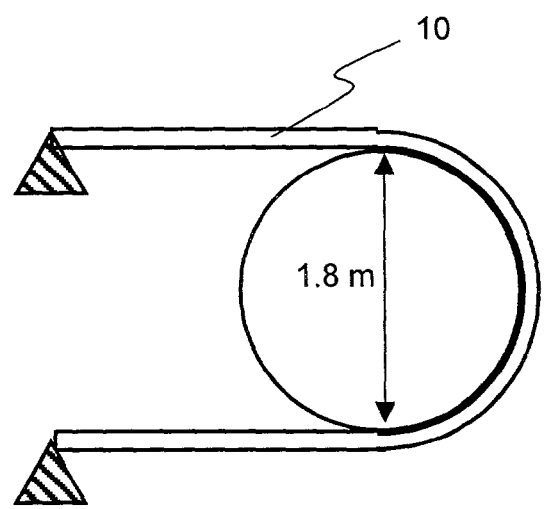
FIG. 3 is a layout of the clamped head cooling test effected on the cable of the present invention.

Cooling tests in clamped head configuration (see FIG. 3) were carried out on 20 m-long samples in U-arrangement under a bending diameter of 1.8 m.

The same superconducting conductor/inner tube configurations a)–d) of Example 1 were tested.

During the cooling, the superconducting conductor should axially contract, but because of the clamped heads, a side pressure generates by the superconducting conductor against the crests of the inner tube.

At the end of the test (i.e. when the total structure of the cable reaches the temperature of 77 K the cooling is stopped and the sample return to the room temperature) the central position (of about 2 m), i.e. the one bent on the 1.8 m diameter, of each sample were cut off, and critical current measurements were carried out thereupon comparing the values obtained before and after the test, as already explained in Example 1. The results are set forth in Table 2.

TABLE 2

| Superconducting conductor/cryostat protecting element | $Ic/Ic_0$ for the inner superconducting layer | $Ic/Ic_0$ for the outer superconducting layer |
|---|---|---|
| a) none | 95% | 70% |
| b) 2 layers of carbon paper | 100% | 100% |
| c) 1 layer of PTFE + 1 layer of copper tapes | 100% | 100% |
| d) 1 layer of carbon paper + 48 0.5 mm-thick wires of tefloned copper | 100% | 100% |

The results of this test show that the application of a protecting element between the superconducting conductor and the corrugated inner tube of the cryostat, according to the invention, avoids the irreversible damage to the superconducting material when the thickness of the protecting layer has a certain value.

The invention claimed is:

1. A Superconducting cable comprising:
a support with an inner surface which defines a channel wherein a cryogenic fluid flows;
a superconducting conductor positioned externally to said support;

a cryostat positioned externally to the superconducting conductor, said cryostat including a thermal insulation enclosed between an inner tube and an outer coaxial tube;

a protecting element positioned between the superconducting conductor and the inner tube of the cryostat;

an electric insulation layer positioned externally to said cryostat.

2. The Superconducting cable according to claim 1 wherein the protecting element provided between the superconducting conductor and the inner tube has a substantial constant thickness.

3. The Superconducting cable according to claim 1 wherein the protecting element has a smooth internal surface.

4. The Superconducting cable according to claim 1 wherein the protecting element has a firm and flexible external surface.

5. The Superconducting cable according to claim 1 wherein the protecting element comprises one or more layers.

6. The Superconducting cable according to claim 5 wherein the protecting element is made of two layers, the inner being smooth and the outer being firm and flexible.

7. The Superconducting cable according to claim 5 wherein at least one of the layers of the protecting element comprises at least one tape, wire, sheet or combination thereof.

8. The Superconducting cable according to claim 7 wherein the at least one tape, or sheet is positioned with juxtaposed windings or rims on the superconducting conductor.

9. The Superconducting cable according to claim 1 wherein the thickness of the protecting element is equal or greater than about 0.2 mm.

10. The Superconducting cable according to claim 9 wherein the thickness of the protecting element is between about 0.2 mm and about 3 mm.

11. The Superconducting cable according to claim 10 wherein the thickness of the protecting element is between 0.4 mm and 1 mm.

12. The Superconducting cable according to claim 1 wherein the protecting element comprises a material selected from polymeric materials, metals, carbon paper, kraft paper, and combination thereof.

13. The Superconducting cable according to claim 12 wherein the protecting element is made of polymeric material.

14. The Superconducting cable according to claim 13 wherein the protecting element is made of polytetrafluoroethylene.

15. The Superconducting cable according to claim 12 wherein the protecting element is made of copper.

16. The Superconducting cable according to claim 1 wherein said cable has a clamped head configuration.

17. The Superconducting cable according to claim 1 wherein said cable is cooled with liquid nitrogen at a temperature typically of from about 65 to about 90 K.

18. The Superconducting cable according to claim 1 wherein the superconducting material is an oxide of bismuth, lead, strontium, calcium, and copper.

19. A Method for protecting a superconducting material of a superconducting cable from mechanical damage resulting from contact with an inner tube of a cryostat, comprising: including a protecting element positioned between the superconducting conductor and the inner tube of the cryostat; and wherein said superconducting cable comprises:

a support with an inner surface which defines a channel wherein a cryogenic fluid flows;

a superconducting conductor positioned externally to said support;

a cryostat positioned externally to the superconducting conductor, said cryostat including a thermal insulation enclosed between an inner tube and an outer coaxial tube; and an electric insulation layer positioned externally to said cryostat.

20. A Current transmission/distribution network comprising:

at least one superconducting cable comprising a support with an inner surface which defines a channel wherein a cryogenic fluid flows; a superconducting conductor positioned externally to said support; a cryostat positioned externally to the superconducting conductor, said cryostat including a thermal insulation enclosed between an inner tube and an outer coaxial tube; and an electric insulation layer positioned externally to said cryostat; and a protecting element positioned between the superconducting conductor and the inner tube of the cryostat.

* * * * *